United States Patent [19]
Schmidt

[11] Patent Number: 5,470,117
[45] Date of Patent: Nov. 28, 1995

[54] VACUUM LIFTER AND METHOD

[75] Inventor: Adolf Schmidt, Duren, Germany

[73] Assignee: Bartholomy & Co., Duren, Germany

[21] Appl. No.: 102,288

[22] Filed: Aug. 5, 1993

Related U.S. Application Data

[63] Continuation-in-part of Ser. No. 764,682, Sep. 25, 1991, abandoned.

[30] Foreign Application Priority Data

Sep. 26, 1990 [DE] Germany ............... 90 13 525.3

[51] Int. Cl.$^6$ ............... B66C 1/02
[52] U.S. Cl. ............... 294/64.1; 294/907
[58] Field of Search ............... 294/64.1, 64.2, 294/65, 907; 414/627, 737, 752; 901/40

[56] References Cited

U.S. PATENT DOCUMENTS

| | | | |
|---|---|---|---|
| 2,812,061 | 11/1957 | Pfister | 294/64.1 X |
| 2,999,715 | 9/1961 | Firestone | 294/64.1 |
| 3,219,380 | 11/1965 | Carliss | 294/64.1 |
| 3,227,299 | 1/1966 | Draxler | 414/627 X |
| 3,782,560 | 1/1974 | Kahwati | 294/64.1 X |
| 3,865,420 | 2/1975 | Warren | 294/64.1 |
| 3,999,795 | 12/1976 | Barker | 294/64.1 |
| 4,509,891 | 4/1985 | Lipscomb | 294/64.1 X |
| 5,059,088 | 10/1991 | Klein | 294/64.1 X |

FOREIGN PATENT DOCUMENTS

| | | | |
|---|---|---|---|
| 1901704 | 8/1970 | Germany . | |
| 8435161 | 5/1985 | Germany . | |
| 3902663 | 8/1990 | Germany | 414/627 |
| 210286 | 8/1989 | Japan | 294/64.1 |
| 624860 | 9/1978 | U.S.S.R. | 294/64.2 |
| 1212911 | 2/1986 | U.S.S.R. | 294/64.1 |
| 1284930 | 1/1987 | U.S.S.R. | 294/64.1 |

Primary Examiner—Johnny D. Cherry
Attorney, Agent, or Firm—Joseph W. Berenato, III

[57] ABSTRACT

A vacuum lifter for a moving load having an adhesion surface comprising at least one suction head having several annular seals projecting from its suction side and forming vacuum spaces enclosed by the seals. The vacuum spaces communicate with a vacuum source. The vacuum source communicates through valves with the outer vacuum space. The valves are controlled by sensors detecting the magnitude of the adhesion surface of the load. In order to prevent impulsive detachment and especially unwanted renewed lifting of the load after it has been deposited, a compressed-air system associated with at least one of the vacuum spaces and a control system turns ON and OFF the compressed-air system in order to initially raise the pressure to atmospheric and to thereafter generate a positive pressure air cushion separating the lifter from the load.

20 Claims, 2 Drawing Sheets

VACUUM LIFTER AND METHOD

CROSS-REFERENCE TO RELATED APPLICATIONS

This is a continuation-in-part of application Ser. No. 07/764,682, filed Sep. 25, 1991 now abandoned.

FIELD OF THE INVENTION

The invention concerns a vacuum lifter and method for moving loads. The lifter has at least one suction head having several annular seals projecting from its suction side. Vacuum spaces are enclosed by the seals. The vacuum spaces communicate with a vacuum source which also communicates with an outer vacuum space through a valve controlled by sensors measuring the magnitude of the adhesion surface of the load being carried. In addition, the invention includes a method for rapidly releasing the lifter from the load, thereby permitting the lifter to be rapidly lifted prior to or while being moved to the next load to be lifted.

BACKGROUND OF THE INVENTION

As a rule, vacuum lifters are used as crane accessories; however they are also mounted on conveyance means such as fork lifts with lift masts, on balancing equipment, manipulators, roller reversers or the like. Multiple mountings also are possible. Such vacuum lifters for instance allow raising and conveying rolls of wound bands, for instance made of paper, metal, plastic or laminates, and, depending upon the shape of the suction head, by coming to rest against the end face or the periphery of the prone or upright roll. Flat bodies also, for instance panels, may be transferred by such vacuum lifters.

A vacuum lifter of this species illustratively is described in the German Gebrauchsmuster 84 35 161.6. Its suction head is a plane suction plate to the lower side of which are mounted several concentrically spaced annular seals. These annular seals enclose mutually separated vacuum spaces which, when the suction plate is deposited on the pertinent adhesion surface of a load to be transported, will form sealed annular chambers when and if the load is covered. The "annular" seals need not be circular but may be of any other shape, for instance being oval or polygonal provided they form a closed ring. Nor is it necessary that they be one inside another. They may also enclose adjacent vacuum spaces or be distributed over several suction plates.

The vacuum spaces are connected through apertures in the suction plate with a vacuum source, for instance a pump. A valve is associated with each of the vacuum chambers outside the inner one, and is present in the connection to the vacuum source. Each valve is coupled to a sensor measuring the magnitude of the adhesion surface of the load when the vacuum lifter is lowered. The sensor is always mounted in such a way that it opens the valve when the adhesion surface is so big that the associated vacuum chamber shall be completely sealed upon deposition on the adhesion surface. In this manner only those vacuum spaces that form closed annular chambers after deposition of the vacuum lifter on the load shall reliably communicate with the vacuum source and therefore shall not suck-in unwanted air.

In particular, mechanical pickups are applicable as sensors to control the valves, and these sensors project downwardly beyond the plane of the annular seals and are forced upwardly by the load adhesion surface when suction is applied. However, other sensors, for instance optical ones, also are usable. The mechanical pickups always are mounted on the outside of the pertinent annular seal because thereby the associated valve shall reliably be opened only when the load adhesion surface is larger than the associated annular or vacuum chamber.

Now it may happen that the diameter of the adhesion surface of the load is precisely the same size as the outside diameter of one of the annular seals, so that the adhesion surface does not project outwardly beyond the annular seal. Consequently the associated sensor mounted on the outside of this annular seal will not measure, and in the event of being a measuring pin, will not be forced upward. In that event the associated valve shall not be opened, whereby, in turn, the vacuum space enclosed by this annular seal remains unconnected to the vacuum source and therefore is not evacuated. As long as the vacuum spaces inward from this vacuum space generate enough holding force to move the load, no drawback regarding moving the load is incurred for the time being.

However problems do arise when thereafter raising the vacuum lifter off the deposited load, particularly because it has been necessary to approximate when the vacuum chamber(s) was at neutral or because a time of more than sufficient duration was allowed to elapse in which the neutral was to be obtained. In this procedure the annular seals that were elastically compressed by means of the vacuum during the transport elastically move apart, so that during a short segment of the raising motion they remain in contact with the load adhesion surface. The inner, vented vacuum spaces can then draw in air, but not the outer vacuum space that was not subjected to vacuum during said transport. Because of the elastic outward motion of the annular seals, an undesired vacuum suction force has been created. If it is less than the weight of the load that was just deposited, then, as the vacuum lifter is raised off, detachment takes place impulsively with possible errors in control sequence. If the vacuum force were to be larger than the weight of the deposited load, then initially this load is carried along. The air which no longer is evacuated and now follows the load is the predominant cause of the collapse of the vacuum suction in this vacuum chamber, whereby the load crashes in uncontrollable manner and is damaged. Moreover, there is significant danger of an accident.

U.S. Pat. No. 3,999,795 describes a vacuum lifter of which the vacuum head comprises three suction plates, each with one annular seal. These three suction plates are not associated each with one valve, instead only with one central valve by means of which communication with the vacuum source may be set up. Moreover, compressed air equipment is provided, which includes an injector feeding a de-icing liquid. By switching the central valve, de-icing liquid can be periodically supplied to the vacuum chambers, the compressed air ensuring atomization.

Moreover, a vacuum lifter is disclosed in U.S. Pat. No. 4,865,420 which comprises a vacuum head with a plurality of suction cups, whereby for instance eggs can be moved. The vacuum head communicates with a vacuum pump acting as the vacuum source, and the vacuum head alternatingly can be connected to the suction or the pressure side of the vacuum pump. However such a design is unsuitable for vacuum lifters of the above species.

SUMMARY OF THE INVENTION

The object of the invention is to so design a vacuum lifter of the initially cited kind that impulsive detachment and especially unwanted, renewed lifting of the load following its deposition shall be avoided under all conditions.

This problem is solved by the invention in that a compressed-air system is associated with at least one of the vacuum chambers and in that a control system is provided which, following detection that the communication with the vacuum source was interrupted and following venting of this (these) vacuum chamber(s), shall in a controlled manner turn the compressed-air system on and off in order to bring the vacuum in the vacuum chamber(s) to neutral and to thereafter cause the vacuum lifter to release from the load by the generation of a compressed air cushion. Because the vacuum lifter is reliably detached from the load, then the throughput of the lifter is increased because the lifter may now transport more loads than was previously possible.

The compressed air system being controlled in this manner, it is possible to produce excess pressure whereby the vacuum lifter is reliably separated from the deposited load and thus overcomes the suction formed in the vacuum chamber which, for the reasons described above, is out of communication during transport with the vacuum source. Preferably, the compressed air system is connected to all vacuum chambers because therein sufficient excess pressure can be produced. Thus, radial force directed to seals 10, 11 (and 12 provided chamber 14 is connected to vacuum box 32) is the lowest possible, avoiding unnecessary stress.

In a further development of the invention, a pressure sensor measuring the pressure in the associated vacuum chamber is part of the automated control system and so affects said automated control system that the compressed air system shall be turned ON only after the pressure has risen in the associated vacuum chamber above a given value, preferably about 0.1 to about 0.2 bars below atmospheric pressure. Moreover, a timing link may be provided to again operate the compressed air system after the lifter has begun to be lifted from the load, thereby generating the compressed air cushion.

Appropriately the compressed air system includes a compressed-air reservoir to ensure adequate available compressed air at all times.

DESCRIPTION OF THE INVENTION

Figure 1:
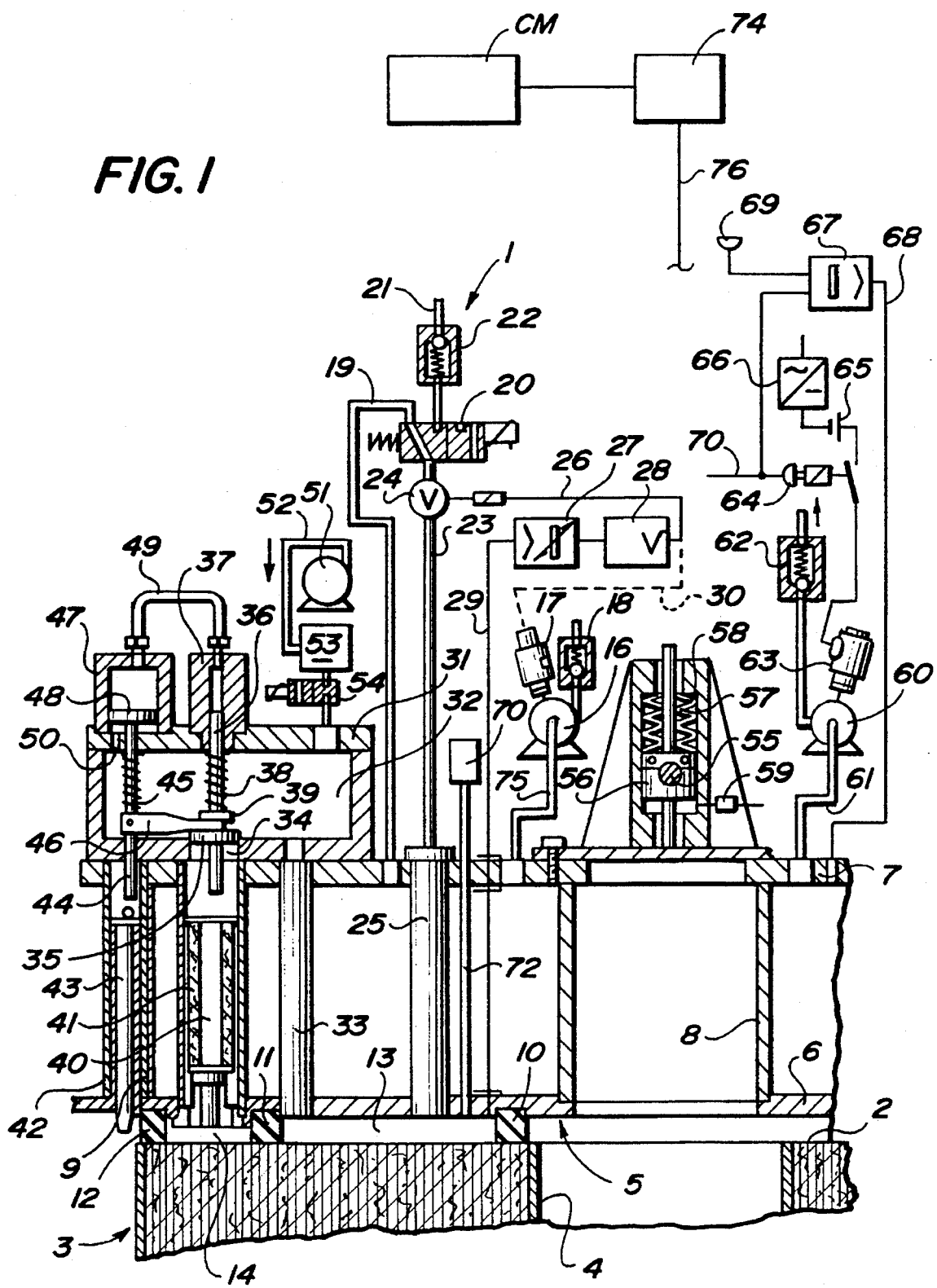
FIG. 1 is a fragmentary cross-sectional view, partially in schematic, of a vacuum lifter according to the invention.

The invention is illustrated in FIG. 1 by means of a schematic, vertical section of an embodiment. The right-hand part of the invention has been omitted from the drawing which shows the left and center parts of a vacuum lifter 1 seated on the top side 2 of an upended paper roll 3 having an inside winding tube 4. The paper web is wound on this winding tube 4.

The main part of the vacuum lifter 1 is a vacuum vessel 5 which is circular in topview. It is made in welded, vacuum-tight manner and its lower seal is a suction plate 6, while at the top it has a top plate 7. A center pipe 8 is present at the center zone and forms the internal seal of the vacuum vessel 5. The vacuum vessel 5 is sealed along its outside by peripheral side wall 9.

Three elastomeric annular seals 10, 11, 12 are mounted concentrically with the center vertical axis of the vacuum lifter 1 at the lower side of the suction plate 6. By means of these annular seals 10, 11, 12 the vacuum lifter 1 rests on the top side on adhesion surface 2 of the paper roll 3. The inner annular seal 10 is of such a large diameter that it falls outside the winding tube 4, as a result of which no unwanted air can be aspirated through the winding tube 4. Together with the farther out center annular seal 11, the inner annular seal 10 forms an inner, annular vacuum space 13. The outer annular seal 12 together with the center annular seal 11 forms another, annular and outer vacuum space 14 separated by the center annular seal 11 from the inner vacuum space 13. If the vacuum lifter 1 has a larger diameter, additional vacuum spaces toward the exterior may be provided in corresponding manner.

The vacuum vessel 5 communicates through a vacuum line 15 with a vacuum source 16. The vacuum source 16 is connected to an angular-speed control 17 and moreover comprises a check valve 18. The vacuum source 16 keeps the vacuum vessel 5 acting as a reservoir to a constant, specific reduced pressure.

A vacuum pipe 19 issues from the vacuum vessel 5 and leads to a three-way valve 20 which is driven electromagnetically. The three-way valve 20 comprises an outlet 21 equipped with a check valve 22 to set up communication to atmospheric air. Moreover, a pipe 23 is connected to valve 20 and has a control valve 24 communicating with through-pipe 25. The through-pipe 25 passes through the vacuum vessel 5 and is open toward the inner vacuum space 13.

The control valve 24 is connected through a control line 26 to a test-value transducer 28 cooperating with a test-value pickup 27 which in turn is connected through a test line 29 passing through the vacuum vessel 5 to the inner vacuum space 13. Another control line 30, shown in dashed lines, is connected to the angular-speed control 17.

In the shown position of the three-way valve 20, the vacuum vessel 5 communicates through the vacuum pipe 19, the three-way valve 20, the pipe 23, the control valve 24 and the through-pipe 25 with the inner vacuum space 13. Said space 13 therefore is subjected to full vacuum, which is set by means of the control valve 24 at a specific value detected by means of the test line 29, the test-value pickup 27 and the test-value transducer 28 and fed as a control value to the control valve 24. Further control of the vacuum takes place by means of the angular-speed control 17.

If the vacuum of the inner vacuum space 13 is eliminated or reaches a neutral value, then the three-way valve 20 is switched to the vent position. In this manner the pipe 23, the through-pipe 25 and hence the inner vacuum chamber 13 communicate through the check valve 22 with the atmosphere. In this way, the inner vacuum space 13 is vented to atmosphere and a neutral value established therein. Furthermore, control valve 24 simultaneously shifts so that the communication between the vacuum line 15 and the pipe 23 is interrupted; that is, the vacuum in the vacuum vessel 5 is maintained.

A vacuum box 31 is seated on the external part of the top plate 7 of the vacuum vessel 5. The inner space 32 of this box 31 communicates by means of a through-pipe 33 passing through the vacuum vessel 5 with the inner vacuum space 13, that is, the inner space 32 is at the same pressure as is present in the inner vacuum space 13.

At its bottom side the vacuum box 31 comprises a valve port 34 cooperating with a valve head 35. The valve head 35 is mounted on a hollow valve rod 36 open at its top and bottom sides. By its upper end, the valve rod 36 rests inside valve-rod guide 37. A further valve-rod guide not shown herein in further detail is present near the lower end of the valve rod 36. A compressing helical spring 38 encloses the valve rod 36 in the zone of the inside space 32 and rests at its top against the valve-rod guide 37 and at its bottom against collar 39 above valve head 35. Accordingly, the valve head 35 is spring-loaded toward the valve port 34.

The valve port 34 continues downward into a filter pipe 40 passing through the vacuum vessel 5 and issuing into the external vacuum space 14. A filter insert 41 is mounted inside the filter pipe 40 and allows the suction air from the external vacuum space 14 to flow through it when the valve head 35 is raised off the valve port 34.

A guide pipe 42 is mounted externally on the side wall 9 of the vacuum vessel 5 and inside of it a mechanical detecting pin 43 is held relatively loosely so as to be vertically displaceable. It is located immediately next to the outside of the external annular seal 12.

An actuation rod 44 is supported in vacuum tight manner above and in the axial extension of the mechanical detecting pin 43 in the lower and upper walls of the vacuum box 31. Rod 44 is enclosed in the zone of the inside space 32 of the vacuum box 31 by a compressing helical spring 45 generating the same spring force as the helical spring 38 of the valve rod 36. The helical spring 45 rests against the top wall of the vacuum box 31 and at the bottom against a forked lever 46 rigidly affixed to the actuation rod 44. The forked lever 46 extends horizontally as far as the valve rod 36, where it enters in geometrically locking manner between the collar 39 and the valve head 35. In this manner the valve head 35 follows the motions of the actuation rod 44.

The actuation rod 44 projects upward out of the vacuum box 31 into a compensating cylinder 47. Rod 44 has at one end a compensating piston 48 moving in sealed manner inside the compensating cylinder 47, with the piston surface corresponding to that of the valve head 35. The space above the compensating piston 48 is connected through a compensation line 49 to the valve-rod guide 37. The space underneath the compensating piston 48 communicates through a compensating borehole 50 with the inside 32 of the vacuum box 31.

As regards vacuum lifters with additional external vacuum spaces, each vacuum space is arranged in a prescribed manner, the particular vacuum boxes communicating with the particular nearest inner vacuum spaces.

In the embodiment of FIG. 1, the detection pin 43 is in its lowest position because the diameter of the paper roll 3 just coincides with the outside diameter of the outer annular seal 12. Thus, when the vacuum lifter 1 is deposited onto the paper roll 3, the valve head 35 will not be raised. Thereby, the vacuum forces acting on the valve head 35 in the direction of opening because of the vacuum in the inside space 32 and those acting through the compensation borehole 50 on the lower side of the compensation piston 48 will balance on account of the essentially coinciding diameters of the valve head 35 and compensation head 48. That is, the actuation rod 44 and thus the forked lever 46 are forced downwardly by a force corresponding to that acting upon the valve head 35 in the direction of opening. Because of this balance, the valve head 35 is pressed merely by the helical springs 38, 45 against the valve port 34.

In the typical case, the diameter of the paper roll 3 does not precisely match— and this is shown in FIG. 1— the outside diameter of the external annular seal 12. If the diameter is larger, then the detecting pin 43 may not yet be actuated when the vacuum lifter 1 has been deposited onto the roll 3, because pin 43 projects beyond plate 6 a distance less than the distance the annular seals 10, 11, 12 project even when the seals are somewhat compressed by the weight of the vacuum lifter 1. It is only when the three-way valve 20 has been moved into the position of FIG. 1, whereby the vacuum space 13 is subjected to full vacuum, that the annular seals 10, 11, 12 will be compressed to such an extent that the detection pin 43 comes to rest against the top side 2 of the paper roll 3 and is forced upwardly. Thereby, it also bridges the distance between its upper end and the lower end of the actuation rod 44 which it carries along.

Thereupon, by means of the forked lever 46, the valve head 35 is raised off the valve port 34 against the action of the helical springs 38, 45. In this manner the outer vacuum chamber 14 is also evacuated through the filter pipe 40, the valve port 34, the vacuum box 31 and the through-pipe 33. By raising the valve head 35, pressure balancing takes place at its top and bottom, whereby, in the absence of further steps, the force generated by the vacuum at the lower end of the compensation piston 48 would move the actuation rod 44 and hence the valve rod 36 down again. However, the valve rod 36 being hollow and there being communication through the compensation line 49 to the compensation cylinder 47, the space above the compensation piston 48 also is evacuated, whereby the initially extant pressure differential is eliminated.

After the paper roll 3 has been deposited, and as already described above, the inner vacuum space 13 is vented by actuating the three-way valve 20. This venting also affects the inside space 32 of the vacuum box 31 and thereby the outer vacuum space 14 because the valve head 35 is still open. When the vacuum lifter 1 is being raised, the detection pin 43 again moves out of its guide tube 42 and, as a result, the valve head 35 and the actuation rod 44 descend again on account of the action of the helical springs 38 or 45 until the valve head 35 has sealed the valve port 34.

The above-described situation assumes that the paper roll 3 is of a diameter larger than shown in FIG. 1, so that the detection pin 43 shall be raised when the lifter 1 comes down. However that is not the case illustrated in FIG. 1, and the detection pin 43 remains in its downwardly projecting position. As a result, the valve port 34 remains sealed, even though the outer vacuum space 14 is closed by the top side 2 of the paper roll 3 and could be evacuated. The size of the inner vacuum space 13 is chosen so that, in these instances, the suction in the space 13 exerts sufficient force to lift and transport the roll 3 while it is suspended from lifter 1. There is thus no need for vacuum in the outer vacuum space 14 in those cases. However, upon depositing the roll 3 and thereafter raising the vacuum lifter 1, a problem may arise that a vacuum is generated in the outer vacuum space 14 by the elastic motion of the annular seals 11, 12—because, unlike the vented inner vacuum space 13, no air can migrate into space 14. This may result in the paper roll 3 being raised by the vacuum lifter 1 and being moved some distance until the vacuum in the outer vacuum space 14 is slowly eliminated by air entering through the material of the paper roll 3. The paper roll 3 will no longer be supported once sufficient air has migrated into space 14, so that the roll 3 may crash in uncontrolled manner.

Figure 2:
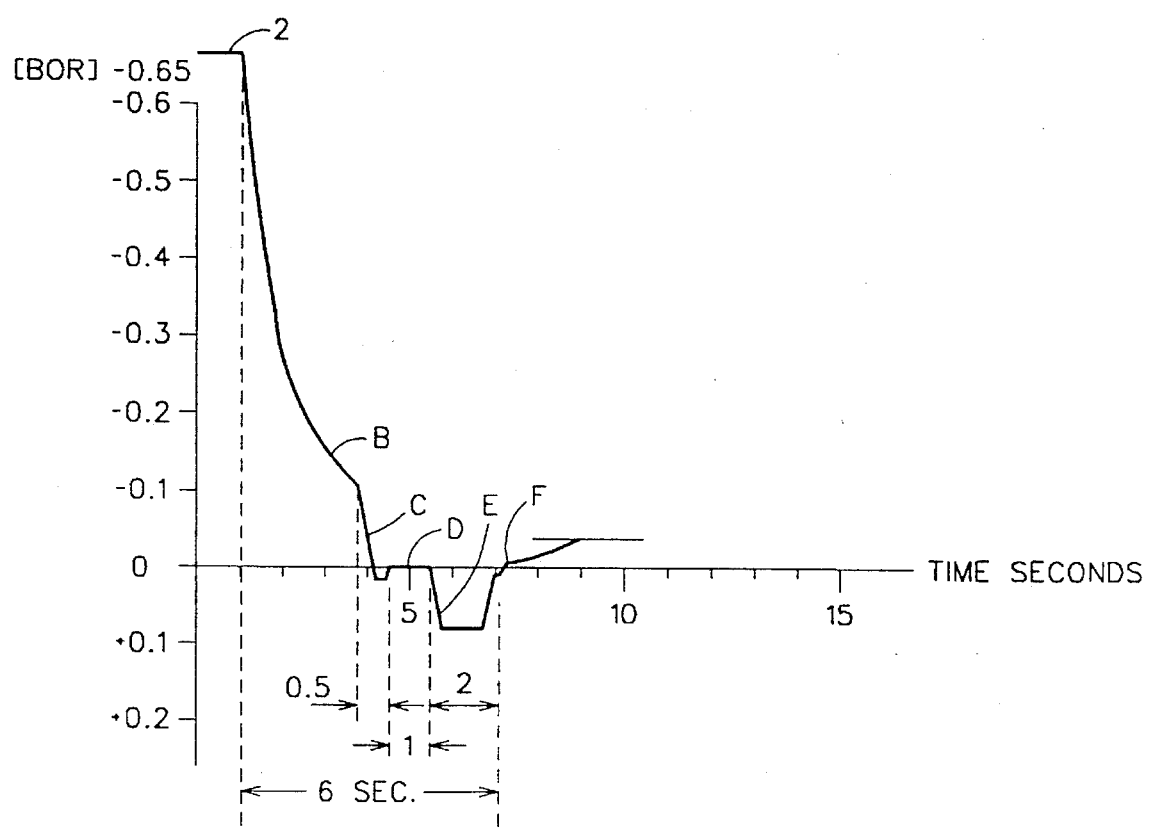
FIG. 2 is a graph of time versus pressure for operation of the vacuum lifter of FIG. 1.

In order to prevent the above problem, a compressed-air source 51 is provided which communicates through a compressed-air line 52 with a compressed-air reservoir 53 and through a magnetic valve 54 with the inside space 32 of the vacuum box 31. Ordinarily, the magnetic valve 54 is closed. After the paper roll 3 has been deposited and the three-way valve 20 switched to the venting position, then the magnetic valve 54 is opened by an automatic control, which may be a programmable controller, once the vacuum in the vacuum space 13 has risen to a preset value of between −0.1 and −0.2 bar from the initial value of −0.65 bar, as best shown at B and A, respectively, in FIG. 2. Pressure sensor 71 communicates with space 13 through line 72 in order to monitor the vacuum/pressure within space 13 and to output a corresponding signal to the controller (not shown) when that preset vacuum level has been achieved. The controller, among other functions, controls the valve 54. The valve 54 is thereafter kept open for about 0.5 seconds, as best shown in FIG. 2 at C, during which compressed air is actively blown into space 13 through through-pipe 33. This is sufficient for the space 13 to reach a neutral or atmospheric pressure, at which point the valve 54 is then again closed.

Once the sensor 71 senses a neutral vacuum level in space 13, then the control transmits a signal to crane works 74 that lifting of vacuum lifter 1 may now begin, as best shown at D. The check valve 22 prevents the air from flowing out through the pipe 23 and through the three-way valve 20 in the venting position.

The vacuum lifter 1 is centrally suspended from a crane travel works 74 in well-known manner. The lower end of crane works 74, which may include a cable 76, is connected with a support bolt 55 displaceably resting in slide blocks 56 in a vertical guide 57. The slide block 56 rests against a set of cup springs 58. Limit switch 59 is mounted in the lower part of the vertical guide 57, and is actuated once the slide blocks 56 have reached their lower end position. The limit switch 59 is coupled by the control means with the three-way valve 20.

When the paper roll 3 has been deposited, then the cable 76 of crane travel works 74 becomes slack, so that the slide blocks 56 and the support bolt 55 descend within guide 57. Eventually, the limit switch 59 is actuated by the slide blocks 56 and the three-way valve 20 is then switched from the position of FIG. 1, wherein the vacuum is applied to the inner vacuum space 13, to the venting position, so that the inner vacuum space 13 automatically is connected to the atmosphere. Another limit switch may be connected as a slack-cable safety device to the crane travel works 74 and turns it off automatically.

Once the pressure sensor 71 signals to the crane works 74 that the vacuum lifter 1 may be raised, then cable 76 is wound up and slide block 56 lifts from switch 59 and begins to compress spring 58. The relatively short travel distance of slide block 56 can be expressed as a function of time, because the weight of lifter 1 and the hoist speed of crane works 74 is known, and an adjustable time function, which may be readjusted at start-up, may therefore be provided to establish when cable 76 becomes taut.

As best shown in FIG. 2, once cable 76 becomes taut, which takes about 1 second, then valve 54 is again shifted for about 2 seconds, at E, in order to cause compressed air from reservoir 53 to be expelled through through-pipe 33. The compressed air creates an air cushion which separates vacuum lifter 1 from roll 3, at F, thereby permitting a higher lifting speed of crane works 74 to be achieved. This also avoids the undesired lifting of a roll which has just been let down.

Because valve 54 is closed after the initial compressed air blow, then the compressor 51 may recharge the reservoir 53 with air. There is thus enough air available to create the air cushion when the valve 54 is again shifted to the open position. Because of this sequence, several seconds of time are gained in the course of setting down a roll and lifting the lifter 1. These seconds result in increased operating efficiency.

The vacuum lifter 1 also includes an emergency vacuum source 60 communicating through an emergency vacuum line 61 with the inner space of the vacuum vessel 5. The emergency vacuum source 60 also is secured by a check valve 62. The emergency source 60 is driven by a DC motor 63 connected by a pressure switch 64 to a battery 65. The battery 65 is connected to a battery-charging apparatus 66 permanently connected to the power supply and in this manner is continuously kept optimally charged.

The pressure switch 64 is connected to a test-value pickup 67 which is in turn connected through a test line 68 with the inside of the vacuum vessel 5. The test-value transducer 67 is set in such a way that it emits a close signal to the pressure switch 64, which is a magnetic switch, when the test line 68 ascertains that the vacuum in the vacuum vessel 5 has dropped below a specified minimum value. Thereby the DC motor 63 will be actuated, and hence the emergency vacuum source 60, and the vacuum drop in the vacuum vessel 5 will be compensated and the normal vacuum level shall be reached again. At the same time, a signal generator 69 emits a malfunction signal to reliably alert the operator that the vacuum produced by the vacuum source 16 is inadequate to move the paper roll 3.

A remote control line 70 also starts from the pressure switch 64 to allow an operator to actuate the pressure switch 64 independently from or alternatively to the above described automated system in order to start the emergency vacuum source 60.

Illustratively, a drop in vacuum may be caused by a malfunction of the vacuum source 16, but also because the vacuum-grip properties of a paper roll 3 have degraded the time-dependent viscoelastic and hygroscopic behavior to such an extent that the vacuum source 16 no longer suffices for sufficient vacuum. In that case the emergency vacuum source 60 may additionally be used as required by the operator.

It had been the previous practice to estimate when the vacuum in space 13 had reached neutral, either by assuming that the vacuum would degrade based upon some predetermined curve or simply by waiting what was believed to be a sufficient time. Generation of an air cushion to lift the lifter 1 from the roll 3 could therefore entail losses, because the pressure within space 13 could become so high as to radially stress the seal 10 toward the winding tube 4. This was a particular problem for small diameter seals, which are desired in order to maximize the effective suction area. Because of the initial air burst herein, then radial stressing of the seal 10 is avoided and yet increased throughput is achieved because the sensor 71 monitors the actual vacuum in the space 13.

While this invention has been described as having a preferred design, it is understood that it is capable of further modifications, uses and/or adaptations of the invention, following the general principle of the invention and including such departures from the present disclosure has come within known or customary practice in the art to which the invention pertains, and as may be applied to the central features hereinbefore set forth, and fall within the scope of the invention of the limits of the appended claims.

I claim:

1. A vacuum lifter to move loads having an adhesion surface, said lifter comprising at least one suction head with a plurality of annular seals projecting from a suction side thereof and where these seals form vacuum spaces and which are each connected to a vacuum source communicating through valve with an outer vacuum space, said valves being controlled by sensors detecting the span of the load, characterized in that a compressed-air system (51, 52, 53) is in fluid communication with at least one of the vacuum spaces (13) and in that an automated control system is provided which sequentially turns on and off the compressed-air system (51, 52, 53) in order with a first opening of the valve to raise the pressure in at least one vacuum space to approximately atmospheric and to thereafter with a second opening of the valve create a positive pressure air cushion which separates the adhesion surface from the suction head.

2. Vacuum lifter defined in claim 1, wherein a blocking valve prevents the vacuum space from being vented to the atmosphere.

3. Vacuum lifter defined in claim 1, wherein the compressed-air system (51, 52, 53) communicates only with an inner vacuum space (13).

4. Vacuum lifter defined in claim 1, wherein a pressure sensor detects the pressure in an associated vacuum space and transmits a signal to the control system so that said control system thereby causes said compressed air system to be operated.

5. Vacuum lifter defined in claim 1, wherein said control system includes a timer for operating said compressed-air system (51, 52, 53).

6. Vacuum lifter defined in claim 1, wherein said compressed-air system (51) comprises a compressed-air reservoir (53).

7. A vacuum lifter, comprising:

a) a vacuum vessel having an adhesion surface;

b) at least first and second seals extending from said surface and creating therewith a vacuum space;

c) a vacuum source operably associated with said space for causing a vacuum to be selectively applied thereto;

d) a pressure sensor operably associated with said space for monitoring the pressure therein and for generating a responsive signal;

e) a pressurized air source operably associated with said vacuum space for selectively supplying air thereto; and f) an automated control means operably associated with said sensor and with said vacuum and pressurized air sources for preventing said vacuum source from supplying a vacuum to said space when a predetermined air pressure is detected by said sensor and for simultaneously causing said pressurized air source to supply a first burst of air to said space so that said space achieves a predetermined pressure and thereafter a second burst of air creating a positive pressure air cushion separating said adhesion surface from a load.

8. A vacuum lifter defined in claim 7, wherein:

a) said pressurized source includes an air compressor as a reservoir.

9. A vacuum lifter defined in claim 8, wherein:

a) a control valve is interposed between said reservoir and said space and is operably associated with said control means for controlling the flow of air to said space.

10. A vacuum lifter defined in claim 9, wherein:

a) said control means includes means for temporally spacing said bursts.

11. A vacuum lifter defined in claim 7, wherein:

a) said vacuum vessel includes a vacuum chamber bounded by said adhesion surface;

b) said vacuum source is operably connected to said chamber for applying the vacuum thereto; and c) means operably extend from said chamber to said space for selectively causing the vacuum in said chamber to be applied to said space.

12. A vacuum lifter defined in claim 11, wherein:

a) a through-tube extends through said chamber and communicates with said space; and b) said pressurized air source is operably associated with said tube for supplying air thereto and thereby to said space.

13. A vacuum lifter defined in claim 11, wherein:

a) means are operably associated with said space for selectively venting said space.

14. A vacuum lifter defined in claim 13, wherein:

a) said causing means and said venting means include an integral valve which in a first orientation causes the vacuum in said chamber to be applied to said space and in a second orientation causes the vacuum application to said space to be interrupted and said space to be vented.

15. A vacuum lifter defined in claim 7, wherein:

a) each of said seals is formed from a resilient, compressible material; and b) said seals are concentrically disposed.

16. A method for lifting, moving, and separating a lifter from a load, comprising the steps of:

a) providing a vacuum lifter having an externally disposed vacuum space, means for selectively applying a vacuum to the space, and means for supplying pressurized air to the space;

b) lowering the lifter onto a load and applying a vacuum to the space and thereby securing the load to the lifter;

c) raising and moving the lifter and thereby the load;

d) lowering the lifter and thereby the load to a rest position;

e) preventing the vacuum from being supplied to the space;

f) permitting the vacuum in the space to degrade;

g) applying a first burst of air to the space in order to bring the space to atmospheric pressure;

h) beginning to lift the lifter from the load;

i) automatically applying a second burst of air to the space and thereby forming a positive pressure air cushion separating the lifter from the load; and j) raising the lifter.

17. A method as defined in claim 16, including the step of:

a) determining that the pressure in the space is atmospheric through use of a sensor.

18. A method as defined in claim 17, including the step of:

a) initiating the second air burst after a predetermined time has elapsed from when the sensor has determined that the pressure in the space is atmospheric.

19. A method as defined in claim 16, including the step of:

a) continuing the first burst of air for a period sufficient to raise the pressure in the space to atmospheric.

20. A vacuum lifter for transporting loads having an adhesion surface, comprising:

a) a suction head including a suction side;

b) a plurality of annular seals projecting from said suction side and defining therebetween a plurality of vacuum spaces;

c) a vacuum source in fluid communication with at least an outer one of said vacuum spaces;

d) a valve interposed between said outer vacuum space and said vacuum source for controlling the vacuum applied thereto;

e) a source of compressed air in fluid communication with at least one of said vacuum spaces; and f) automated control means operably associated with said compressed air source for communicating a first burst of compressed air to said one vacuum space to raise the pressure in said one vacuum space to about atmospheric and to thereafter with a second burst of compressed air generate a positive pressure cushion in said one vacuum space sufficient to separate said suction head from the adhesion surface.

* * * * *